Sept. 4, 1951  E. B. COOK  2,566,316
VIBRATOR
Filed Aug. 3, 1946

INVENTOR
Eugene B. Cook
BY
William L. Gates
ATTORNEY

Patented Sept. 4, 1951

2,566,316

UNITED STATES PATENT OFFICE 2,566,316

VIBRATOR

Eugene B. Cook, Milwaukee, Wis., assignor to Allis-Chalmers Manufacturing Company, Milwaukee, Wis., a corporation of Delaware Application August 3, 1946, Serial No. 688,232

10 Claims. (Cl. 74—1)

This invention relates to reciprocating motors and vibrators, particularly of the type in which a resiliently mounted reciprocable mass element is forced to vibrate relative to a massive reaction support by a periodic force. More particularly the invention concerns reaction supports and resilient mountings for the reciprocable elements of such a motor.

In heavy machinery, where a machine part having substantial weight is designed to be vibrated at frequencies on the order of 25 or more cycles per second at appreciable amplitudes, such as on the order of one to three sixty-fourths of an inch the provision of a suitable resilient mounting which will be stable, efficient and durable is a difficult problem.

An object of the present invention is to provide an improved resilient mounting for the reciprocable element of a vibrator.

Another object concerns the provision, in a vibrator, of an improved reaction support, spring and power transmission structure.

A more specific object concerns the provision of an improved disk spring mounting for the reciprocable elements of an industrial vibrator.

The above and still further objects and advantages which will be apparent from a reading of this specification can best be carried into practical effect as described hereinbelow with reference to the accompanying drawing in which like reference characters indicate the same or similar parts throughout the several views and in which.

Figure 1:
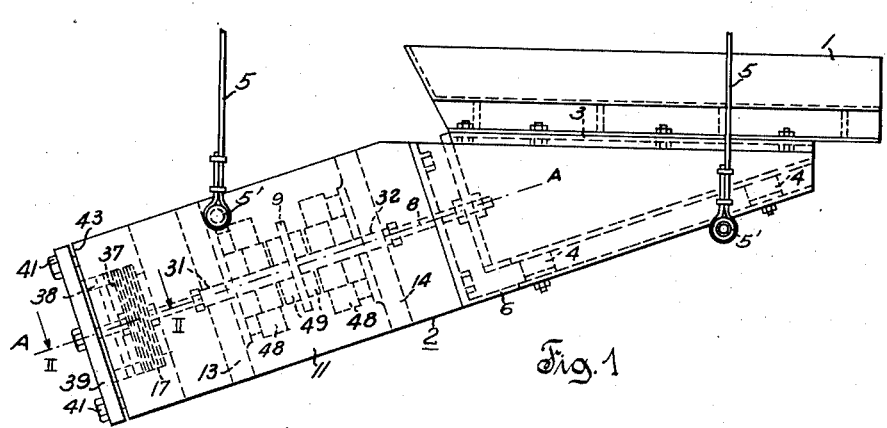
Fig. 1 is a lateral elevation of an industrial feeder embodying the present invention.

In the drawing the present invention is shown as embodied in an industrial vibratory feeder, in which a feeder pan 1 is mounted in relatively vibratable relation to a massive reaction frame 2.

In the preferred embodiment the vibratory element, such as pan 1, is provided with a suitable movable mounting bracket 3, resting on suitable resilient rubber mountings 4, or other suitable known weight supporting mountings (not shown), readily providing for translatory motion of pan 1 along an axis such as A—A relative to frame 2. Such mountings may engage a suitable guide bracket 6 rigidly secured to frame 2.

The feeder is preferably supported from a building structure or base (not shown) as by cables 5 attached by any known suitable means such as bosses 5' to frame 2.

Figure 2:
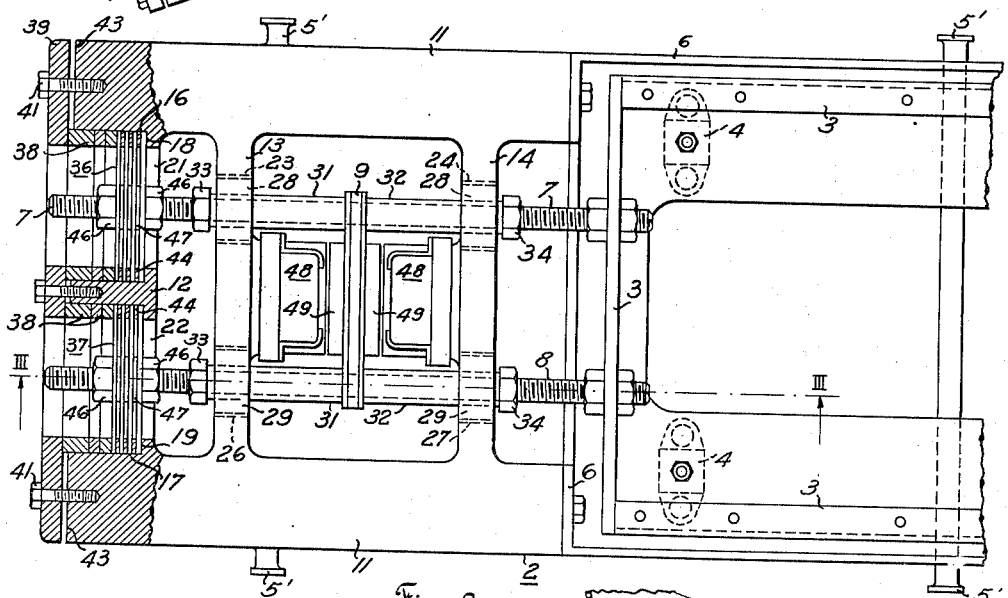
Figs. 2 is an enlarged view of a portion of the structure of Fig. 1, shown partly in section on the line II—II.
Figure 3:
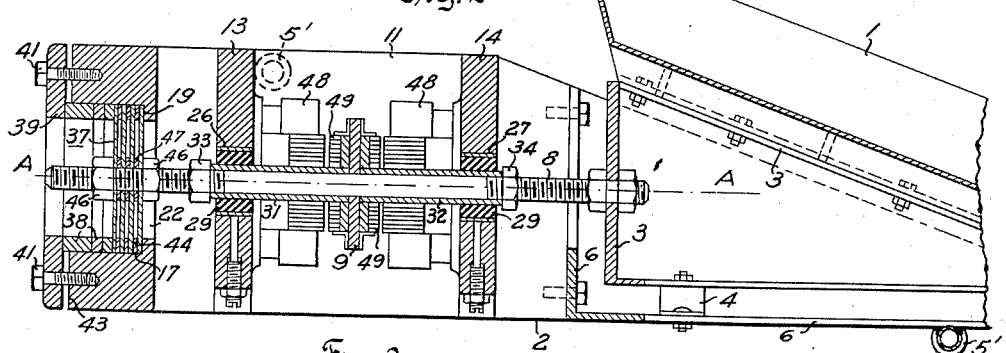
Fig. 3 is a view in section taken on the line III—III of Fig. 2, showing the feeder pan of Fig. 1 in place.

A power transmission element, shown in the preferred embodiment as parallel rods 7 and 8 transversely joined by cross member 9, is connected at one end in axially fixed relation to bracket 3, or otherwise secured at one end in axially fixed relation to pan 1. The connection is made in the preferred embodiment by passing the forward ends of rods 7 and 8 through suitable holes provided in bracket 3 and securing the rod ends as by the use of nuts threaded on the rod ends as clearly shown in Figs. 2 and 3 of the drawing. The rods 7 and 8 are so placed relative to pan 1 and bracket 3 as to be parallel and to lie substantially in a plane containing the center of gravity of the portion of the movable mass made up of the pan 1 and connecting bracket 3.

The massive frame 2 is a generally rectangular, box-like element, with heavy side portions 11 joined at one end by a heavy rear cross member 12 extending transversely between sides 11. One or more additional transverse bars, shown in the drawing as 13 and 14, connect the sides 11 at points axially spaced from rear cross member 12.

The rear cross member 12 is formed with a pair of cylindrical recesses 16 and 17 opening in its rear face with their axes parallel and substantially in a plane containing the center of gravity and axis A—A of the frame 2. The inner end of cylindrical recesses 16 and 17 is marked by narrow annular shoulders 18 and 19 forming abutments for purposes to appear hereinafter. And apertures 21 and 22, of smaller diameter than recesses 16 and 17, penetrate the portion of cross member 12 beyond the planes of shoulders 18 and 19, respectively, in direction toward the front end of frame 2. Cross members 13 and 14 are formed with holes 23, 24, 26 and 27 alined with the axes of recesses 16 and 17, to provide for the mounting of rods 7 and 8 in parallel axially movable relation to frame 2 with their rear ends in recesses 16 and 17 and their shanks extending forward through apertures 21 and 22 and holes 23, 24, 26 and 27.

If desired, rubber bushings 28 and 29 may be employed between rods 7 and 8 and the cross members 13 and 14, such bushings permitting axial movement of the rods through substantial amplitudes relative to cross members 13 and 14.

Cross member 9 may be axially fixed relative to rods 7 and 8, as shown, by having its apertured ends, through which rods 7 and 8 pass, clamped between spacer sleeves 31 and 32, the clamping action being provided by nuts 33 and 34 on the threaded ends of rods 7 and 8.

The main, axially resilient connection between rods 7 and 8 and frame 2 consists, in the preferred embodiment, of a pair of annular spring disks 36 and 37 fitting in the recesses 16 and 17, respectively. Peripheral portions of disks 36 and 37 may engage shoulders 18 and 19, respectively. The disks 36 and 37 are clamped, at their peripheral portions, in axially fixed relation to frame 2, as between shoulders 18 and 19 and a clamping ring or rings 38 arranged to oppose shoulders 18 and 19 within the recesses 16 and 17. These rings 38 can be forced axially toward shoulders 18 and 19 as by clamp plate 39, connected to frame 2 by bolts 41. Rings 38 are of suitable thickness and number so that the rearmost extends rearwardly beyond the rear face 43 of the frame member 2.

It will be seen in the illustration that a plurality of disks 36 and a corresponding plurality of disks 37 may be employed in recesses 16 and 17, and that annular spacer rings 44 may be inserted between the peripheral portions of the disks to establish a space between successive disks in a series. Such a plurality of disks 36 and spacer rings 44 will form a laminated disk spring unit, the center portion of which may be secured in axially fixed relation to rods 7 and 8.

As shown in the drawing the rear threaded ends of rods 7 and 8 pass through the central apertures of annular disks 36 and 37, and nuts 46 on the threaded end engage narrow annular center portions of opposite sides of disks 36 and 37, to clamp such center portions in axially fixed relation to such rods 7 and 8. And, where parallel series of disks 36 and 37 are used, spacer rings 47, preferably of the same thickness as spacer rings 44, may be used between successive disks of a series, to maintain a fixed spacing between the center portions of successive disks.

In frame 2, as on opposed portions of cross members 13 and 14 of frame 2 and cross member 9, the relatively movable elements of a device for applying periodic forces to move across member 9 and the assembly to which it is attached, may be mounted. In the preferred embodiment this device comprises the electromagnets 48 and armatures 49 of an electromagnetic reciprocating motor of suitable type, such as that shown in Wurzbach and Konald Patent No. 2,071,373. Since such motors and their action are well known to the art, and since any known device suitable to apply a periodic force tending to move member 9 axially relative to frame 2 can be employed, no detailed description of the force applying device need be included here.

It will be readily understood that any force applied to member 9 (or rods 7 and 8) in a direction along axis A—A of frame 2 will cause a deflection of the central portions of disks 36 and 37 along their axes relative to the peripheral portions of disks 36 and 37. And it will be apparent that application of periodic forces at resonance with the natural period of the system including the frame, disks, power transmission assembly, and power output element, will cause an effective vibratory motion of the power output element, that is, of pan 1 in the illustrated feeder.

The arrangements of the disk springs 36 and 37 according to the invention in recesses opening rearwardly of frame 2, with the power transmission rods 7 and 8 extending forwardly to the power output element on pan 1 at the forward end of the frame 2, with the vibrating force applied to the rod assembly intermediate its points of attachment to the springs and the pan, provides for ready accessibility of the springs for inspection, and for ready tuning of the resilient mounting by addition or subtraction of spring disks 36 and 37, without disassembly of the machine, other than removal of plate 39 and the rearwardly exposed nuts 46. The arrangement according to this invention also provides for simplicity, compactness and economy of design and construction.

It will be understood that feeder pan 1 is an example of but one form of practical power output member. And any body or mass to be vibrated along an axis may be operatively attached to rods 7 and 8 for vibration therewith, other examples being vibrating screens and sieves and other material treating and conveying devices to which it may be desirable to convey forcibly sustained vibrational movement.

Thus, while a specific embodiment of this invention has been described and illustrated, the invention will be understood to include all such modifications and equivalents as may be readily apparent to persons skilled in the art to which it appertains within the scope of the appended claims.

It is claimed and desired to secure by Letters Patent:

1. In a vibrator having a massive frame, a reciprocable power output element movably mounted with relation to said frame, a rigid power transmission element rigidly connected to said reciprocable power output element, a disk spring having a center portion operatively engaging said power transmission element in axially fixed relation, said disk spring having a peripheral portion operatively engaging said frame in axially fixed relation, and a periodic force impulse applying means having relatively movable members, one attached to said frame and the other to a portion of said power transmitting element, the combination being characterized by attachment of said other member of said force impulse applying means to a portion of said power transmitting element axially intermediate the points of attachment to said element of said disk spring and said power output element.

2. In a vibrator having a massive frame, a reciprocable power output element mounted in axially movable relation to said frame, and motor means on said frame for reciprocating said power output element relative to said frame, the combination comprising a hollow spring disk retaining cylinder portion on said frame, an internal shoulder in said cylinder portion, one or more annular spring disks fitting in said cylinder and having a peripheral portion engageable axially with said shoulder, annular clamping means on said frame opposable to and axially movable relative to said shoulder and adapted to engage a peripheral portion of said spring disk, said clamping means being operable to clamp said peripheral portion of said spring disk axially against said shoulder, a power transmitting element having an end portion secured in axially fixed relation to a center portion of said annular spring disk and a shank portion extending axially in the direction of said annular shoulder, said motor means having a relatively reciprocable portion engaging the shank portion of said power transmitting element and said power output element being connected with the shank of said power transmitting element at a point beyond the point of engagement thereof by said reciprocable motor portion with respect to said disk spring.

3. A vibrator comprising, a massive frame having an outwardly open cylindrical spring disk seat therein with a shoulder formed by a slight reduction of diameter at a point spaced from the open end of said cylindrical seat, one or more disks fitting said cylinder and having peripheral portions engageable with said shoulder, means on said frame for axially clamping said peripheral portion of said disk against said shoulder, a power transmission element coaxially secured to a center portion of said disk and extending inwardly therefrom through said cylinder, means on said frame for applying force impulses to said power transmission element and having a relatively movable portion engaging that portion of said power transmission element extending inwardly from said disk, and a power output member secured to said inwardly extending portion of said power transmission element.

4. In a vibratory system including a reciprocating motor having a massive frame and a reciprocable member, the combination comprising a pair of parallel outwardly open cylinders in said massive frame having internal shoulders spaced from their outer ends, said shoulders being formed by slight reductions in the cylinder diameter, a pair of spring disks mounted in said cylinders and having peripheral portions engaging said shoulders, means on said frame opposable to said shoulders for engaging said peripheral portions of said disks and operable to axially move said disks in the direction of said shoulders, power transmission means secured in axially fixed relation to the centers of said disks and connected inwardly of said frame with said reciprocable member, and reciprocable power output means secured to said power transmission means inside said frame relative to said disks.

5. A vibrator comprising, a massive frame having a pair of parallel outwardly open spring disk retaining cylinders, internal abutments spaced from the open outer ends of said cylinders, a spring disk fitting each said cylinder, clamping means on said frame adapted to engage peripheral portions of said spring disks and force the same axially towards said abutments in said cylinders, a power transmission element rigidly secured in axially fixed relation to center portions of said disks, periodic force impulse applying means on said frame having a relatively movable portion engaging said power transmission element on that side of said disks opposite the open ends of said cylinders, for moving same axially relative to said frame, and a work engaging element rigidly secured to said power transmission element on the same side of said disks, said spring disks being removable without disturbance of the connection between said power transmitting element and said work engaging element.

6. In a vibrator having a massive frame, a work engaging element reciprocable axially of said frame, and periodic force applying means on said frame having a portion reciprocable axially relative thereto, the combination comprising a pair of power transmission rods connected with said reciprocable portion of said force applying means and extending in parallel relation to the axis of said frame, a pair of parallel, outwardly open spring disk retaining cylinders in said frame and surrounding corresponding ends of said rods, a spring disk in each of said cylinders, said spring disk having a peripheral portion clamped in axially fixed relation to said frame and a central portion removably secured in axially fixed relation to one of said rod ends within its respective cylinder, and means connecting said work engaging element to said rods on the side of said disks opposite the open ends of said cylinders.

7. In a vibrator, a massive frame comprising a pair of side members and a plurality of axially spaced transverse members connecting said side members, one of said transverse members having a pair of cylindrical sockets therein with their axes parallel to the longitudinal axis of said frame, a spring disk in each of said sockets having a peripheral portion clamped in axially fixed relation in said socket, openings in the other said transverse frame members alined with each said socket, a pair of power transmission rods extending through said openings in parallel relation and having end portions secured in axially fixed relation to center portions of said spring disks, periodic force impulse applying means mounted in said frame between said rods and having a relatively axially reciprocable force applying element secured to said rods, and a work engaging element operatively connected with said rods.

8. In a vibrator, a massive frame element having side members connected by a rear transverse member and one or more additional transverse members axially spaced forwardly of said rear member, a plurality of rearwardly open generally cylindrical sockets in the rear face of said rear transverse member, holes in said additional transverse members alined with the axis of said sockets and parallel to the longitudinal axis of said frame, a spring disk in each said socket having a peripheral portion secured in axially fixed relation therein, laterally spaced parallel power transmission rods having rear end portions secured in axially fixed relation to center portions of said disks and passing in relatively movable relation through said holes, and periodic force applying means mounted on said frame between said rods and having a relatively reciprocable portion operatively connected with said rods.

9. In a vibrator, a massive reaction frame comprising side members and a plurality of axially spaced transverse members, a plurality of spring disk retaining sockets in an end of one of said transverse members, said sockets being arranged parallel to the longitudinal axis of said frame, openings in said transverse members alined with said sockets, a corresponding plurality of spring disks having peripheral portions clamped in axially fixed relation in said sockets, a corresponding plurality of power transmission rods having end portions fixed to center portions of said disks and extending through said openings in parallel axially movable relation, and a reciprocating motor having a stator rigidly mounted on another of said transverse members in the space between said power transmission rods and a relatively movable armature member secured to said rods in axially fixed relation and supported thereby in operative relation to said stator.

10. In a vibrator having a massive frame, a reciprocable power output element movably mounted with relation to said frame, a power transmission rod rigidly secured at one end to said power output element, a disk spring operatively secured at a center portion in fixed coaxial relation to said rod, said disk spring having a peripheral portion secured in fixed relation to said frame, and means for applying periodic force impulses to said rod in the direction of its longitudinal axis, said force impulse applying means having relatively movable portions one operatively attached to said frame and the other operatively attached to said rod assembly, the combination being characterized by securement of said disk center portion to said rod at the end of said rod opposite that secured to said power output element and attachment of said relatively movable part of said force impulse applying means to an intermediate portion of said rod.

EUGENE B. COOK.

REFERENCES CITED

The following references are of record in the file of this patent:

UNITED STATES PATENTS

| Number | Name | Date |
| --- | --- | --- |
| 773,900 | Soder | Nov. 1, 1904 |
| 1,641,059 | Tausch | Aug. 30, 1927 |
| 1,672,807 | Etzel | June 5, 1928 |
| 2,153,243 | Flint | Apr. 4, 1939 |